US012315482B2

(12) United States Patent
Ivens et al.

(10) Patent No.: US 12,315,482 B2
(45) Date of Patent: May 27, 2025

(54) EXPANDING PEDALBOARD

(71) Applicants: Dylan Gordon Ivens, Keswick (CA); Brent Scott Ivens, Keswick (CA)

(72) Inventors: Dylan Gordon Ivens, Keswick (CA); Brent Scott Ivens, Keswick (CA)

( * ) Notice: Subject to any disclaimer, the term of this patent is extended or adjusted under 35 U.S.C. 154(b) by 429 days.

(21) Appl. No.: 17/569,653

(22) Filed: Jan. 6, 2022

(65) Prior Publication Data

US 2023/0215408 A1 Jul. 6, 2023

(51) Int. Cl.

| | |
|---|---|
| ***G10H 1/34*** | (2006.01) |
| ***A47F 5/10*** | (2006.01) |
| ***B65D 43/24*** | (2006.01) |
| ***G10H 1/32*** | (2006.01) |

(52) U.S. Cl.

CPC ............... *G10H 1/348* (2013.01); *A47F 5/10* (2013.01); *B65D 43/24* (2013.01); *G10H 1/32* (2013.01); *G10H 2220/265* (2013.01)

(58) Field of Classification Search

CPC .... G10H 1/348; G10H 2220/265; A47F 5/10; B65D 43/24

See application file for complete search history.

(56) References Cited

U.S. PATENT DOCUMENTS

| | | | | |
|---|---|---|---|---|
| 2016/0066452 A1* | 3/2016 | Music | | A45C 9/00 206/742 |
| 2020/0294480 A1* | 9/2020 | Trifilio | | G10H 1/0008 |
| 2023/0049515 A1* | 2/2023 | Sims | | A45C 13/02 |

OTHER PUBLICATIONS

Madpedalboards; https://www.instagram.com/p/CCypbohg7FG/; Naked & Unashamed! Our latest design, the "Pop Top"!; accessed Jan. 16, 2024; published Jul. 18, 2020. (Year: 2020).*

Chumleyspedalboards; https://www.instagram.com/p/CEZsVsDH_-3/; These three boards are on sale 10% off! Don't let this deal slip away link in bio!; accessed Jan. 16, 2024; published Aug. 27, 2020. (Year: 2020).*

All Things Weatherly; Schmidt Array SA-9000 Pedalboard Review; https://www.youtube.com/watch?v=mKqB_b3_628; accessed Jan. 16, 2024; published Nov. 10, 2015. (Year: 2015).*

* cited by examiner

*Primary Examiner* — Daniel J Colilla

(57) ABSTRACT

The invention describes a pedalboard for holding instrument effect pedals (guitar, bass, etc) which stores two layers of instrument effect pedals upon vertically stacked platforms for more compact storage but which can also be opened/ expanded using a four-bar linkage mechanism to allow for access to the lower effect pedals during musical performance or practice. The upper platform may be disconnected from the front links and can pivot upward to allow for further access to the lower platform.

11 Claims, 5 Drawing Sheets

Fig. 1
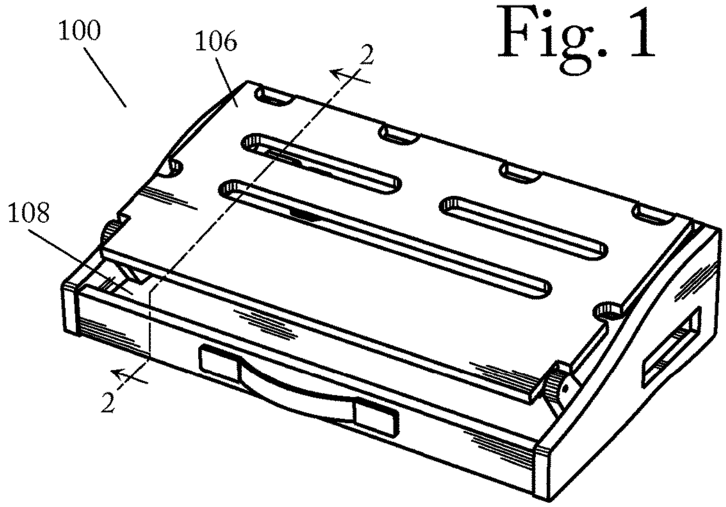
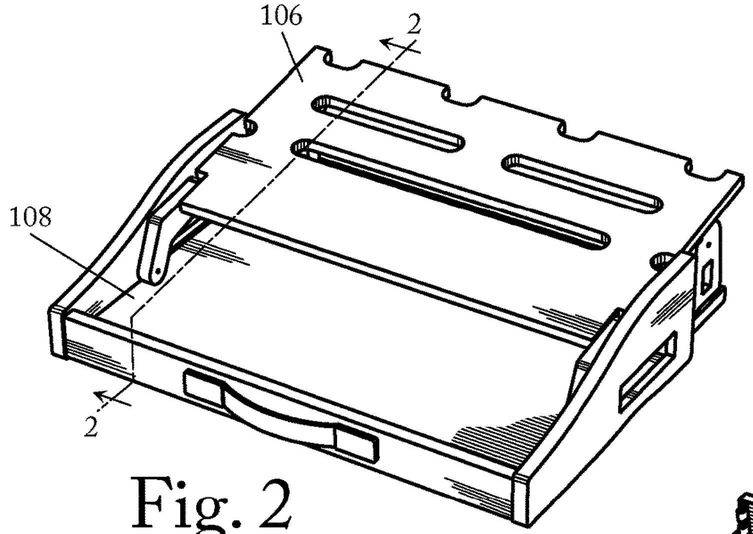
Fig. 2
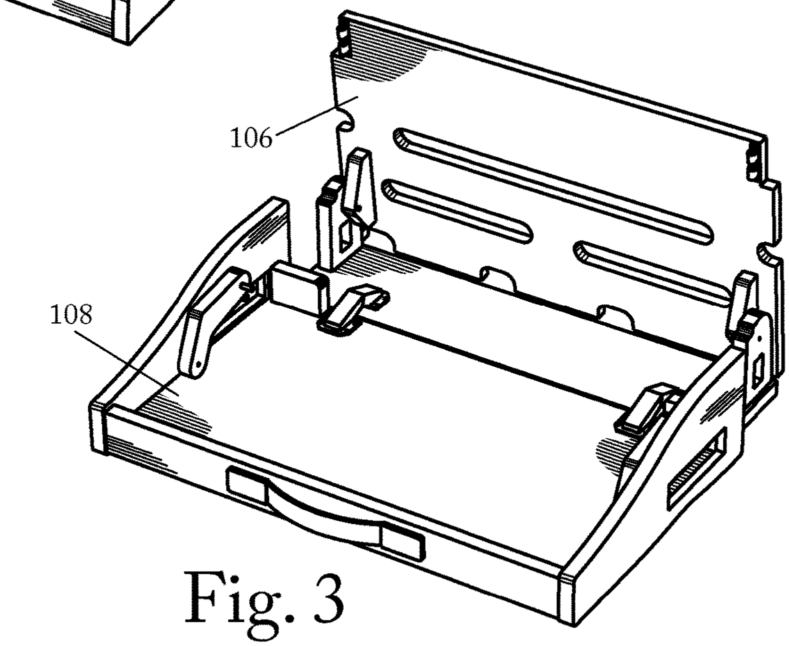
Fig. 3

Fig. 4
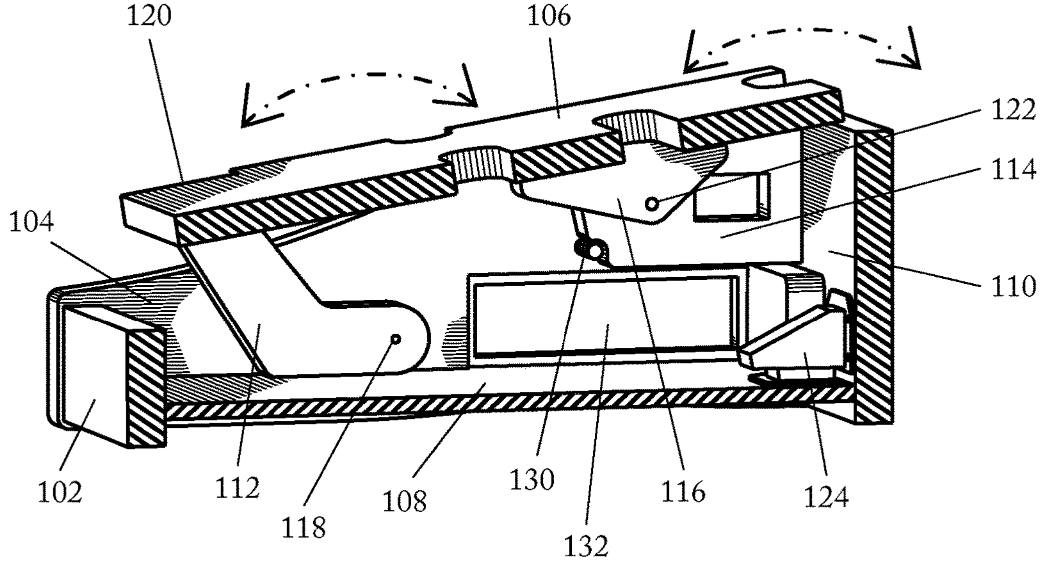
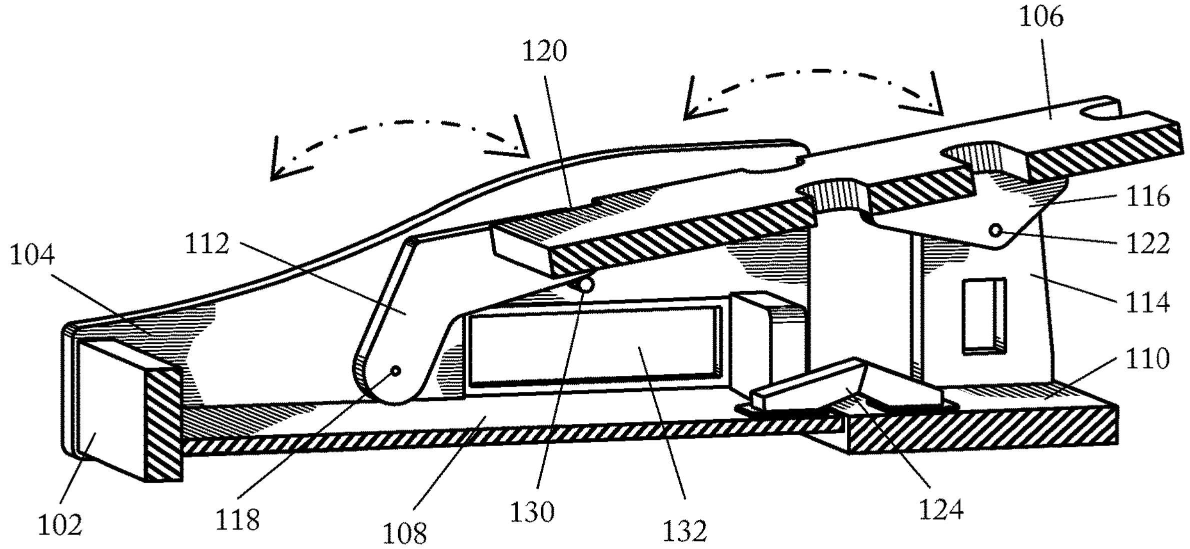
Fig. 5

EXPANDING PEDALBOARD

FIELD OF THE INVENTION

The disclosed invention relates to a pedalboard design for the storage, transportation, and use of musical instrument effect pedals.

BACKGROUND OF THE INVENTION

Many musicians, especially guitarists and bassists, use effect pedal units to modify the sound of their instrument. These effect pedal units (often referred to as 'effect pedals' or simply 'pedals') are usually activated via a foot-accessible switch in order to leave the musician's arms free to play their instrument. Musicians often use a variety of effect pedals to change the sound of their instrument frequently during a performance. A greater variety of pedals provides more creative choice for the musician but also presents new problems, as the pedals must be connected and organized in a manner that supports their use and often must be transported to various locations.

Pedalboards allow musicians to organize their effect pedals by mounting them to a common surface which can be transported as a single unit. Pedalboards can be as simple as a single board of wood. However, various patents exist (especially in the United States) which describe pedalboard designs more suited to their purpose, notably:

U.S. Pat. No. 6,459,023B1, John Chandler

U.S. Pat. No. 6,538,185B1, Michael K. Stratton

U.S. Pat. No. 9,659,553B1, Eddie Lawrence

U.S. Pat. No. 9,997,149B2, ChristianRichard Trifilio

U.S. Pat. No. 10,163,430B2, Danny Ray Jashyn

These designs, along with others, have aimed to improve the ease of use and organization of guitar effect pedals. Although transporting pedals is simplified by using a pedalboard, moving a large collection of pedals can become a cumbersome process. Since pedals must be reached by a musician's foot during use, they are generally arranged as a two dimensional grid on a more or less flat pedalboard. During situations where space is limited (e.g. travel, especially as carry-on luggage) it would be preferable to store the pedals as a vertical stack of such grids which better utilizes vertical space, as seen in larger guitar pedal "racks". Unfortunately, many of the pedals are not easily accessible in this arrangement. A preferable solution would be a pedalboard which is able to store pedals efficiently upon vertically stacked platforms but which is also easily repositionable into an arrangement which allows for access to the pedals stored on each platform.

Lawrence (U.S. Pat. No. 9,659,553B1) describes an arrangement which accomplishes some of these goals with a sliding drawer design as well as an optional fold-down front wall. While a drawer design allows for a one-dimensional displacement between the pedal platforms, the height of the upper platform remains fixed. A preferable solution would use a mechanism which allows for changes in the height and angle of the upper platform depending on its position either for storage or use. This way a user does not have to compromise between optimal space efficiency and ergonomic use.

LIST OF FIGURES

FIG. 1 shows a perspective view of an embodiment of the pedalboard in a compact position for storage or transportation.

FIG. 2 shows a perspective view of the pedalboard in FIG. 1 in an open position for use of the effect pedals.

FIG. 3 shows a perspective view of the pedalboard in FIG. 1 with the upper platform temporarily detached from the front rocker links for setup or maintenance of effect pedals and wiring.

FIG. 4 shows a perspective cross sectional view of the pedalboard in FIG. 1 along line (2-2) in a compact position for storage or transportation, with indications for the direction of movement of the linkage.

FIG. 5 shows a perspective cross sectional view of the pedalboard in FIG. 2 along line (2-2) in an open position, with indications for the direction of movement of the linkage.

Figure 6:
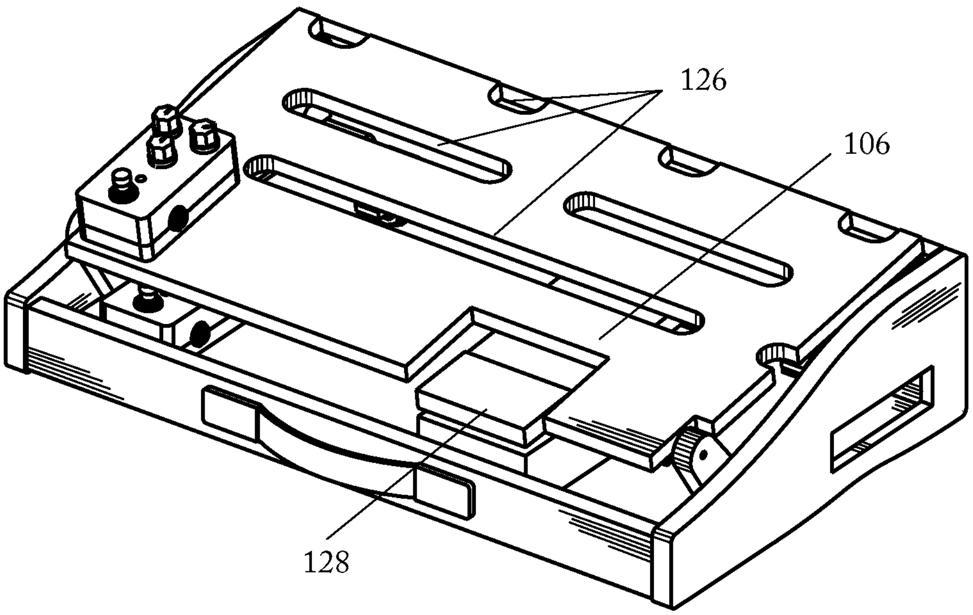
FIG. 6 shows a perspective view of an embodiment of the pedalboard in a compact position for storage or transportation, with effect pedals shown mounted on the upper and lower platforms as well as a modified upper platform to suit the use of larger pedals (Wah, Volume, Expression, etc).

The bottom of the pedalboard is flat and unornamented.

GENERAL DESCRIPTION OF THE INVENTION

The invention describes a pedalboard which allows for the compact storage and transportation of guitar effect pedals while being easily repositionable to an alternate orientation which is less compact but more suited to the ergonomic use of said pedals. The pedals rest on two or more platforms which are positioned above one another while being stored, and then positioned offset from one another during use. Transitions between these positions are accomplished by joining the platforms to each other with pivotable rocker arms, forming a four-bar linkage. Advantageously, the separate pedalboard orientations for storage and use can each be optimized for their respective roles by using appropriate rocker arm lengths, joint locations, and stopping positions.

DETAILED DESCRIPTION OF THE INVENTION

FIG. 1 shows an embodiment of a pedalboard 100 which comprises an upper platform 106 and a lower platform 108 upon which instrument effect pedals or other audio processing units may be affixed. The platforms 106, 108 are able to be repositioned into distinct orientations which are better suited to various purposes. The pedalboard may be composed of any suitably strong and durable materials such as wood, plastic, metal, or any combination thereof.

In FIG. 1 the platforms are stacked vertically above one another for a compact box-like shape which is optimized for storage and travel. In FIG. 2 the platforms 106, 108 have been offset into a less compact but more open position which provides greater access to the effect pedals during a performance or practice. FIG. 3 shows an additional variation of the open position where the upper platform 106 has been tilted back to fully reveal the lower platform 108, allowing for complete access to the lower platform 108 and the underside of the upper platform 106. This is a favorable position for maintenance or adjustments to effect pedals or effect pedal accessories (power supply units, signal junction units, etc) which may not require frequent access.

Referring to FIG. 4 and FIG. 5, the upper platform 106 is connected to the lower platform 108 by a pivoting front rocker 112 and a pivoting rear rocker, forming a four-bar linkage. In the embodiment shown, the rear rocker is an assembly of a back wall 110 and an extension 114 of the back wall which allows for a connection with the upper platform 106 at a pivot point 122 which is suitable for the desired motion of the four-bar linkage. The upper platform 106 has a similar extension 116. The pivot joint 124 between the rear rocker assembly 110, 114 and the lower platform 108 may consist of a hinge which is limited in its range of motion and may determine the stopping positions of the four-bar linkage. In other embodiments, any joint between a rocker and a platform may consist of a similar mechanical component with a limited range of motion. The shape of the rockers or platforms and their extensions may also determine the stopping positions of the linkage as they engage with other components of the linkage during certain ranges of motion. For example, in FIG. 4 the front rocker 112 has a bent shape which encounters the lower platform 108 at the extent of its determined forward range. A protrusion 130 from the side wall 104 may also be used to establish a limit to the range of one or more of the rockers.

Although FIG. 4 shows the linkage assembly on one side of the pedalboard, the embodiment shown is understood to also have a mirrored linkage on the opposite side. The back wall 110 may be a shared component between the mirrored linkages which adds stability to the structure while in each position and while transitioning between positions.

The front rocker 112 may be removably attached to the upper platform 106 by a joint 120 allowing the upper platform 106 to become temporarily detached from the front rocker 112 in order to tilt upwards and reveal the lower platform 108 or the underside of the upper platform 106. This connection may be made by a spring latch, a magnetic latch, or any other suitable latch. The connection point 120 may be extended below the upper platform 106 in a fashion similar to the rear deck extension 116 as necessary to produce the desired mechanics of the four-bar linkage.

In the embodiment shown, the lower platform 108 has fixed side walls 104 which act as extensions of the lower platform 108 and provides a suitable pivoting joint location 118 with the front rocker 112. There is also a front wall 102 which provides structural stability and, along with the side walls 104 and back wall 110, acts as a protective case which encloses the effect pedals mounted on the lower platform 108. Some or all of these walls may be omitted from other embodiments of the pedalboard.

The back wall 110 and the underside of the upper platform 106 may be treated as additional mounting surfaces for suitably sized effect pedals or accessories. In the embodiment shown, the back wall 110 is a component of the four-bar linkage and as such, any pedals or accessories mounted to the back wall 110 will change in orientation as the pedalboard transitions between positions. In the case of power supply units this is particularly advantageous, as the increased physical distance between the power supply unit and other pedals or accessories can reduce unwanted electromagnetic interference from the power supply unit. In the case where the power supply unit is mounted to the underside of the upper platform 106, a similar advantage is achieved due to the increase in physical distance between the power supply unit and the pedals mounted to the lower platform 108 while the pedalboard is in an open position.

The open orientation of the back wall 110 also provides access for power cables and signal cables to pass into the pedalboard when in an open position (as seen in FIG. 5). Advantageously, when the pedalboard is positioned for storage or transportation (as seen in FIG. 4), this access is automatically closed as the back wall moves to a vertical position and aligns with the side walls 104. This contributes to the protection of the pedals and accessories inside the pedalboard, especially when paired with a suitable mated removable lid. The pedalboard may also contain separate passages 132 in the side or front walls allowing for the loose passage of power or signal cables. Connection jacks for such cables may also be permanently mounted into the walls.

In order to prevent unintended transitions between pedalboard positions a locking mechanism may be employed which temporarily attaches components of the linkage together in a fashion which inhibits motion. For example, a latch might be employed which joins the back wall 110 to the side wall 104.

Figure 7:
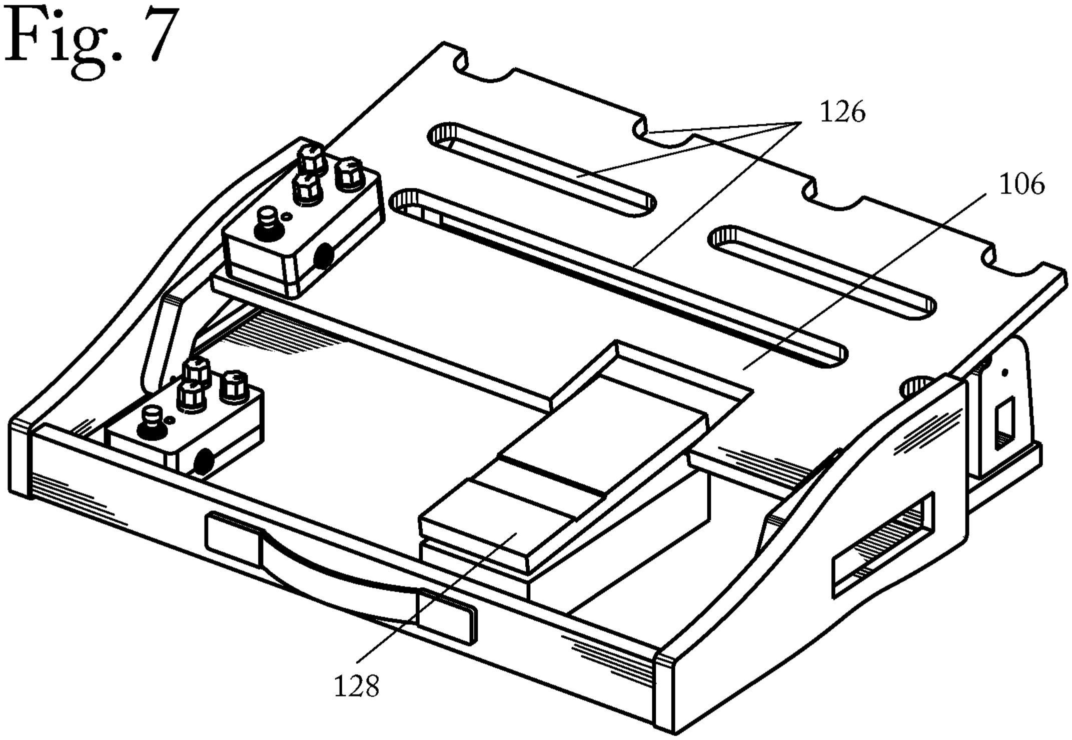
FIG. 7 shows a perspective view of the pedalboard in FIG. 6 in an open position, with effect pedals shown mounted on the upper and lower platforms as well as a modified upper platform to suit the use of larger pedals (Wah, Volume, Expression, etc).
Figure 8:
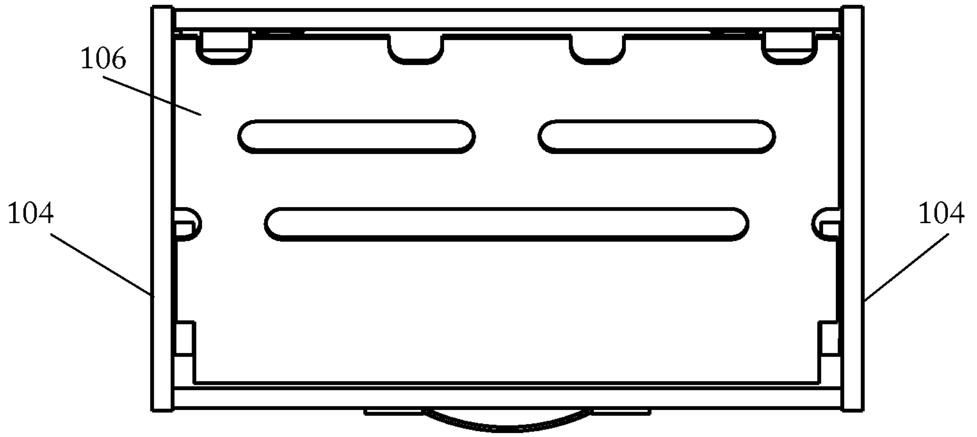
FIG. 8 shows a top view of the pedalboard in FIG. 1 in a compact position for storage or transportation.
Figure 9:
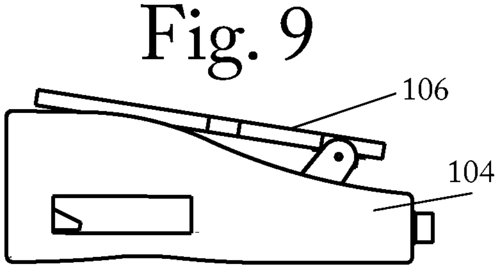
FIG. 9 shows a left side view of the pedalboard in FIG. 1 in a compact position for storage or transportation.
Figure 10:
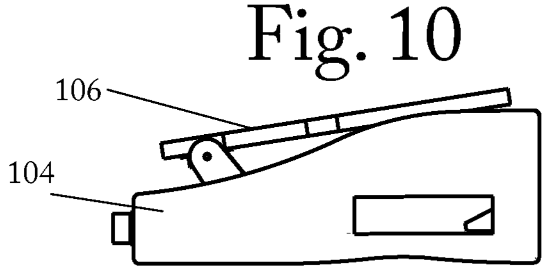
FIG. 10 shows a right side view of the pedalboard in FIG. 1 in a compact position for storage or transportation.
Figure 11:
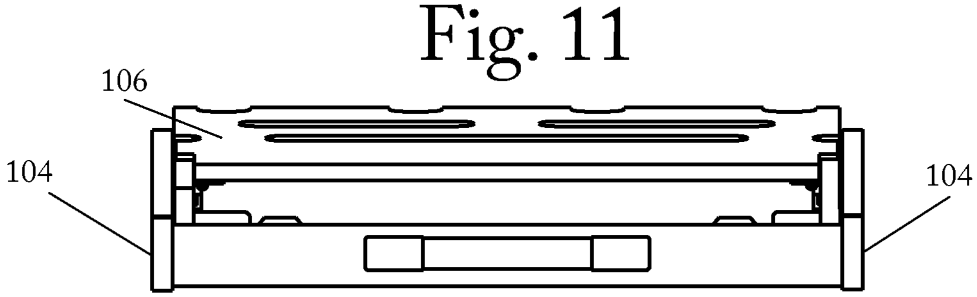
FIG. 11 shows a front view of the pedalboard in FIG. 1 in a compact position for storage or transportation.
Figure 12:
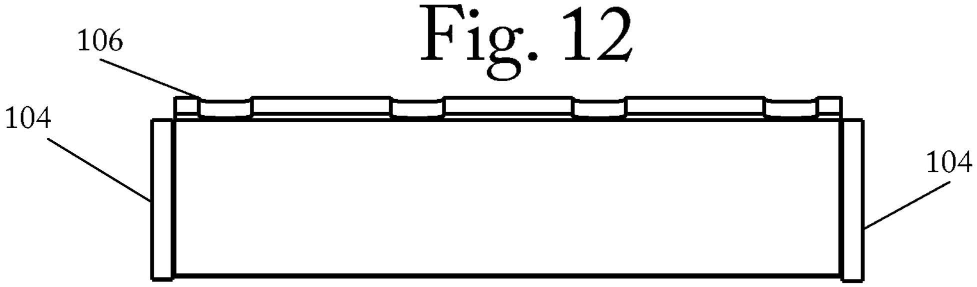
FIG. 12 shows a back view of the pedalboard in FIG. 1 in a compact position for storage or transportation.
Figure 13:
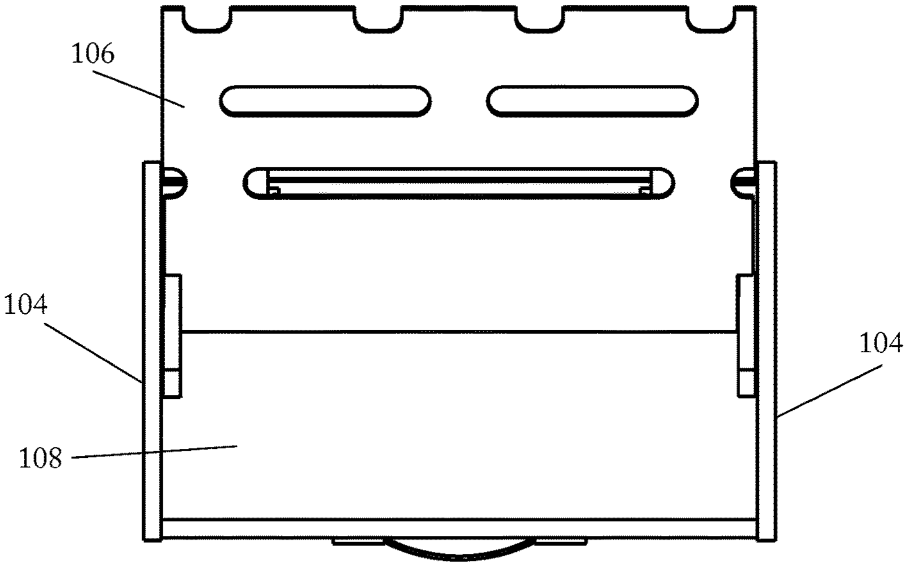
FIG. 13 shows a top view of the pedalboard in FIG. 1 in an open position.
Figure 14:
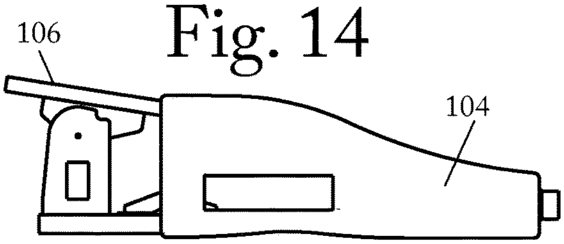
FIG. 14 shows a left side view of the pedalboard in FIG. 1 in an open position.
Figure 15:
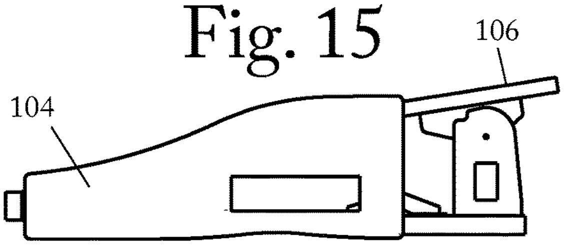
FIG. 15 shows a right side view of the pedalboard in FIG. 1 in an open position.
Figure 16:
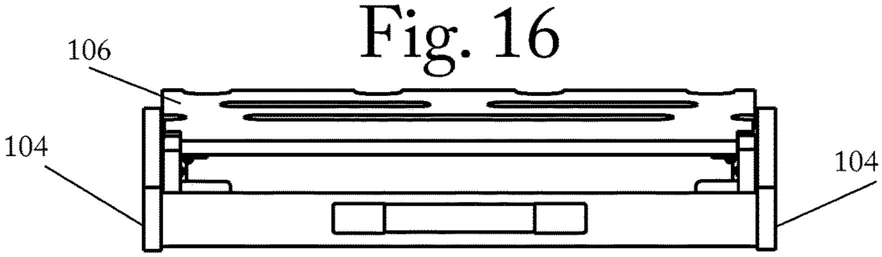
FIG. 16 shows a front of the pedalboard in FIG. 1 in an open position.
Figure 17:
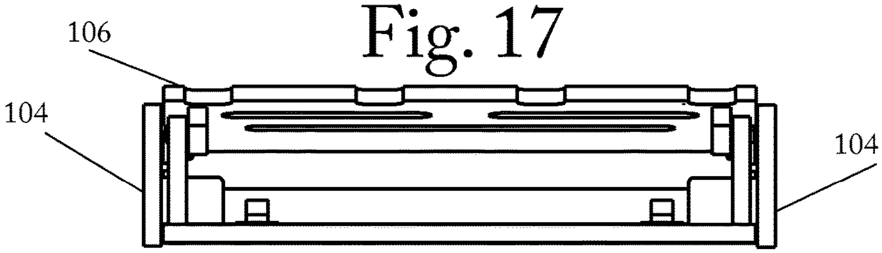
FIG. 17 shows a back of the pedalboard in FIG. 1 in an open position.

In regards to FIG. 6 and FIG. 7, the shape of the upper platform 106 may be modified to accommodate the use of large pedals 128. The upper platform 106 may contain holes or passages 126 for the passage of power or signal cables to the lower platform 108 and vice versa.

The invention claimed is:

1. A pedalboard comprising:

a lower platform and an upper platform configured to have effect pedals affixed thereon;

wherein said first and second platforms are configured to vary in orientation towards one another by means of a first four-bar linkage mechanism;

wherein the first four-bar linkage mechanism include a front rocker link and a rear rocker link so that the lower platform is attached to the upper platform by the front rocker link and the rear rocker link, whereby the pedalboard is configured to alternate between a more compact orientation wherein the upper platform is positioned above and obscures the lower platform, and a more open orientation wherein the proportion of the lower platform that is obscured by the upper platform is less than in the more compact position, wherein the pedalboard is able to transition between the more compact orientation and the more open orientation by a force applied to one or more components of the first four-bar linkage mechanism;

an additional four-bar linkage mechanism configured to act in parallel to the first four-bar linkage mechanism and configured to provide greater stability to the pedalboard in both static positions as well as during transitions between positions, wherein the first four-bar linkage and the additional four-bar linkage share at least one link thereby stabilizing the structure and synchronizing the movement of the first four-bar linkage and the additional four-bar linkage during transitions between positions.

2. The pedalboard described in claim 1, further comprising a frictional surface on the upper and lower platforms configured for fastening effect pedals.

3. The pedalboard described in claim 1, further comprising a fastening mechanism between the upper platform and the front rocker link configured to temporarily detach from the front rocker link.

4. The pedalboard described in claim 1, further comprising holes or channels in the upper platform configured for the passage of signal cables or power cables down to the lower platform and vice versa.

5. The pedalboard described in claim 1, further comprising a locking mechanism to prevent the pedalboard from unintentionally transitioning between orientations.

6. The pedalboard described in claim 1, further comprising a fixed handle to aid in transportation of the pedalboard.

7. The pedalboard described in claim 1, further comprising feet added to the bottom surfaces of the pedalboard configured for preventing slip on a floor during use.

8. The pedalboard described in claim 1, further comprising a mated removable solid lid for added protection during storage or transportation.

9. The pedalboard described in claim 1, further comprising a cutout in the upper platform configured to allow access to an entire large effect pedal and/or control unit on the lower platform while the pedalboard is arranged in the more open orientation.

10. The pedalboard described in claim 1, wherein the lower platform has vertical walls attached to the sides, front, or back of the lower platform, or any combination thereof.

11. The pedalboard described in claim 10, further comprising holes or channels in the channels in the vertical walls configured for the loose passage of electrical cables through the vertical walls.

* * * * *